US012292182B1

(12) United States Patent
Zhang et al.

(10) Patent No.: US 12,292,182 B1
(45) Date of Patent: May 6, 2025

(54) LAMP WITH REPLACEABLE POWER SUPPLY MODULE

(71) Applicant: Signcomplex Limited, Shenzhen (CN)

(72) Inventors: Renxue Zhang, Guangxi (CN); Wenxing Li, Yiyang (CN); Zhibin Li, Zixing (CN); Dongxian Zhang, Shenzhen (CN); Tiejun Wu, Shenzhen (CN)

(73) Assignee: Signcomplex Limited, Shenzhen (CN)

( * ) Notice: Subject to any disclaimer, the term of this patent is extended or adjusted under 35 U.S.C. 154(b) by 0 days.

(21) Appl. No.: 18/902,242

(22) Filed: Sep. 30, 2024

(30) Foreign Application Priority Data

Jul. 30, 2024 (CN) ......................... 202421823198.9
Aug. 1, 2024 (CN) ......................... 202421853897.8

(51) Int. Cl.

| | |
|---|---|
| ***F21V 23/02*** | (2006.01) |
| ***F21V 17/00*** | (2006.01) |
| ***F21V 17/18*** | (2006.01) |
| ***F21V 23/04*** | (2006.01) |
| *F21V 23/06* | (2006.01) |
| *F21V 31/00* | (2006.01) |

(52) U.S. Cl.
CPC .......... *F21V 23/023* (2013.01); *F21V 17/005* (2013.01); *F21V 17/18* (2013.01); *F21V 23/04* (2013.01); *F21V 23/06* (2013.01); *F21V 31/005* (2013.01)

(58) Field of Classification Search
CPC ......... F21W 2131/40; F21W 2131/402; F21V 23/007–009; F21V 23/02–026; F21V 17/16; F21V 17/162; F21V 17/164; F21V 17/166; F21V 17/168; F21V 17/18; F21Y 2105/18; F21K 9/20; F21S 8/04; F21S 8/043; F21S 8/06; F21S 8/061; F21S 8/068
See application file for complete search history.

(56) References Cited

U.S. PATENT DOCUMENTS 12,078,333 B1 * 9/2024 Xu ....................... F21V 19/0055
2017/0276333 A1 * 9/2017 Dubuc .................. F21V 21/008
2023/0184419 A1 * 6/2023 Zhang .................. F21V 23/007
315/51

FOREIGN PATENT DOCUMENTS

CN 116972365 A * 10/2023 .............. F21V 17/10

* cited by examiner

*Primary Examiner* — Abdulmajeed Aziz
*Assistant Examiner* — Steven Y Horikoshi

(57) ABSTRACT

The present disclosure proposes a lamp with a replaceable power supply module, the lamp including: a lamp body; a power supply module electrically connected to the lamp body to supply power to the lamp body, the power supply module being disposed on the lamp body and provided with a locking portion; and a catch, the catch being provided with a catch body and an elastic member connected to the lamp body, the catch body being rotatably connected to the elastic member, and the locking portion being provided with a locking protrusion, wherein the catch body has a catch recess and a mounting opening, the catch recess mating with the locking protrusion, and the mounting opening being located below the catch recess and configured to allow the locking protrusion to enter and exit the catch recess.

12 Claims, 12 Drawing Sheets

LAMP WITH REPLACEABLE POWER SUPPLY MODULE

TECHNICAL FIELD

The present disclosure relates to the technical field of lamps and, in particular, to a lamp with a replaceable power supply module.

BACKGROUND ART

Currently, a lamp on the market generally includes a lamp body and a power supply module. The power supply module is electrically connected (electrically mounted) to the lamp body to supply power to the power supply module. Moreover, the power supply module is also connected (mechanically mounted) to the lamp body via screws, to reliably fix the power supply module to the lamp body. However, during mounting of a light source, it is necessary to use an auxiliary tool to complete the mechanical mounting of the power supply module, so that the mounting operation is cumbersome, and the mounting efficiency is low.

SUMMARY OF THE INVENTION

An embodiment of the present disclosure provides a lamp with a replaceable power supply module to address the problems existing in the related art, the lamp including:

- a lamp body;
- a power supply module disposed on the lamp body, the power supply module being provided with a locking portion; and
- a catch, the catch being provided with a catch body and an elastic member connected to the lamp body, the catch body being rotatably connected to the elastic member, the catch body having a locking station engaged with the locking portion, to connect the power supply module and the lamp body together, the catch body further having an unlocking station disengaged from the locking portion to enable the power supply module to be separated from the lamp body, the catch body rotating to switch between the locking station and the unlocking station, and the elastic member being configured to provide a locking force to the catch body to restrict the catch body to the locking station, wherein the locking portion is provided with a locking protrusion; and
- the catch body has a catch recess and a mounting opening, the catch recess mating with the locking protrusion, and the mounting opening being located below the catch recess and configured to allow the locking protrusion to enter and exit the catch recess.

The above description is merely presented for the purpose of the specification, and is not intended to limit the present disclosure in any way. Except for the above illustrative aspects, implementations and features, further aspects, implementations and features of the present disclosure will become readily apparent with reference to the accompanying drawings and the following detailed description.

BRIEF DESCRIPTION OF THE DRAWINGS

In figures, the same reference signs denote the same or similar components or elements throughout multiple figures unless otherwise specified. These figures are not necessarily drawn to scale. It should be understood that these figures depict only some implementations according to the present disclosure and are not to be construed as limiting the scope of the present disclosure.

DETAILED DESCRIPTION OF EMBODIMENTS

Figure 1:
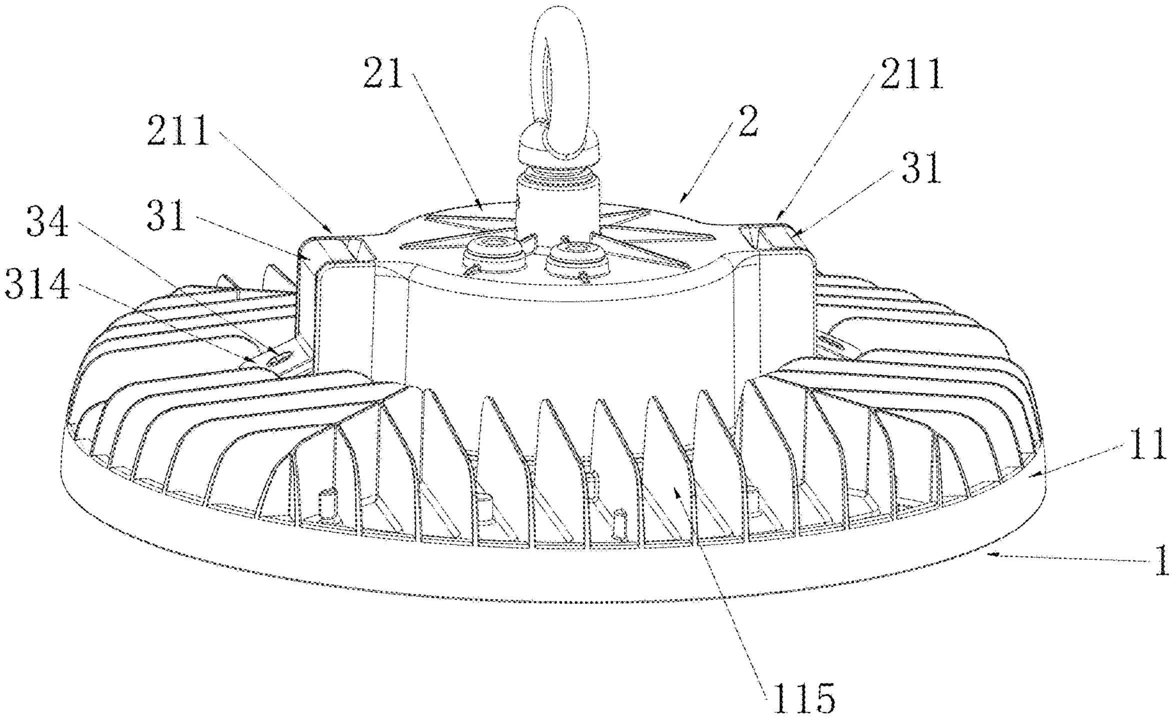
FIG. 1 is a schematic perspective view of the structure of a lamp with a replaceable power supply module in Embodiment 1 of the present disclosure.

Only some exemplary embodiments are briefly described below. As can be appreciated by those skilled in the art, modifications may be made to the described embodiments in various ways without departing from the spirit or scope of the present disclosure. Therefore, the accompanying drawings and the description are considered as exemplary in nature rather than limiting.

Embodiment 1

Referring to FIGS. 1-6, a lamp with a replaceable power supply module according to a preferred implementation of the present disclosure is shown. The lamp includes:

- a lamp body 1;
- a power supply module 2, the power supply module 2 being disposed on the lamp body 1, the power supply module 2 being provided with a locking portion 211, and the power supply module 2 being also electrically connected to the lamp body 1 to supply power to the lamp body 1; and
- a catch 3, the catch 3 being provided with a catch body 31 and an elastic member 32 connected to the lamp body 1, the catch body 31 being rotatably connected to the elastic member 32, the catch body 31 having a locking station engaged with the locking portion 211, to connect the power supply module 2 and the lamp body 1 together, the catch body 31 further having an unlocking station disengaged from the locking portion 211 to enable the power supply module 2 to be separated from the lamp body 1, the catch body 31 rotating to switch between the locking station and the unlocking station, and the elastic member 32 being configured to provide a locking force to the catch body 31 to restrict the catch body 31 to the locking station.

For the lamp in this embodiment, during mounting, it is possible to first electrically connect the power supply module 2 to the lamp body 1, then dispose the power supply module 2 on the lamp body 1, and then engage the catch body 31 with the locking portion 211 to enable the power supply module 2 to be fixed to the lamp body 1 by the locking force provided by the elastic member 32 to the catch body 31, so that a screw-free fixing and mounting of the power supply module 2 is realized. The fixing and mounting process is carried out without the use of tools. The power supply module 2 can be mounted by hand, the mounting operation is simpler and more convenient, and the mounting efficiency is high. During dismounting, a rotation force applied on the catch body 31 against the locking force can cause the catch body 31 to be disengaged from the locking portion 211, to unlock the power supply module 2, and the power supply module 2 is electrically disconnected from the lamp body 1, so that tool-less unlocking of the power supply module 2 is realized. The dismounting operation is simpler and more convenient, and the dismounting efficiency is high, greatly improving the replacement efficiency of the power supply.

Figure 2:
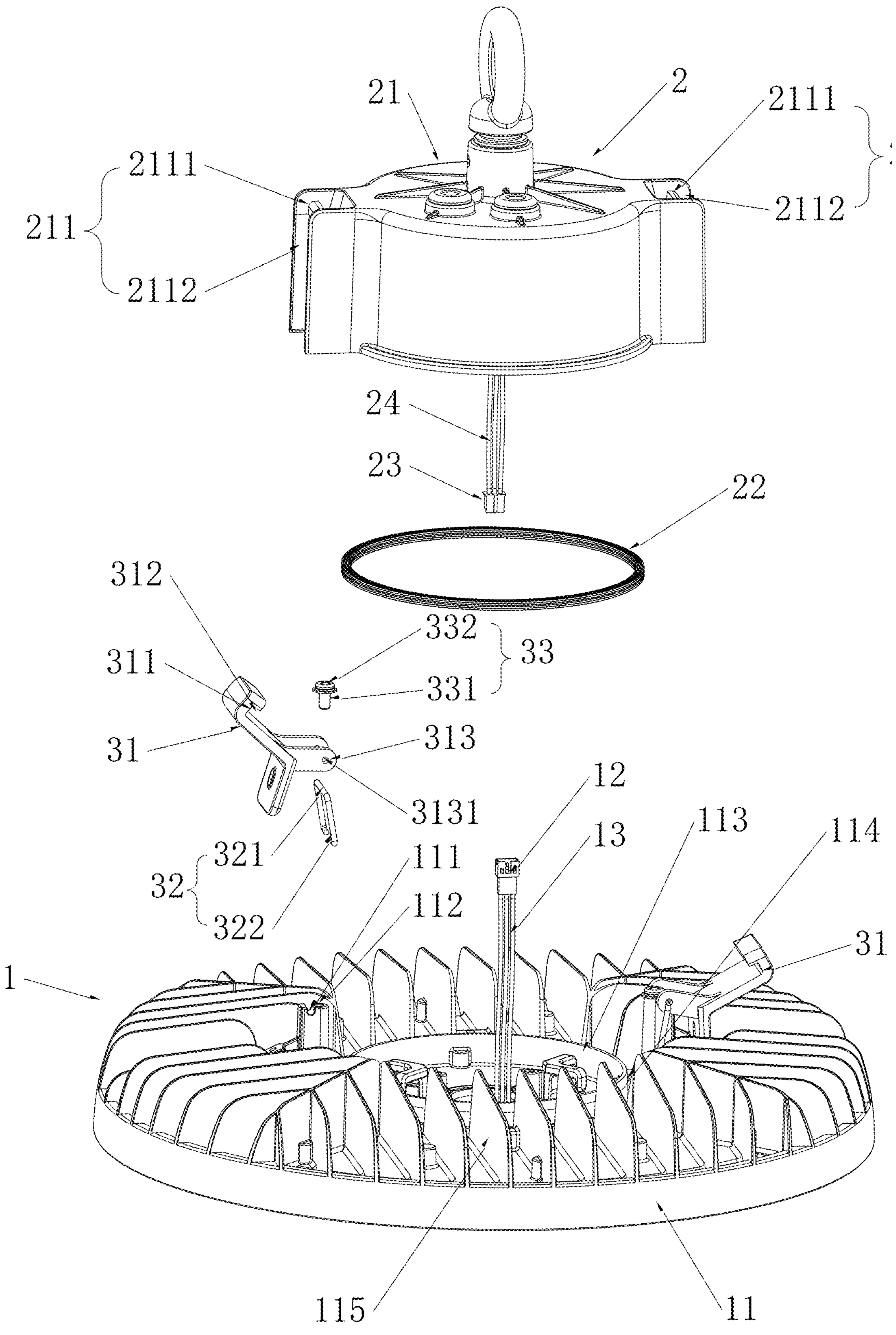
FIG. 2 is an exploded view of the lamp with a replaceable power supply module in Embodiment 1 of the present disclosure.

Referring to FIG. 2, in an implementation, the locking portion 211 is provided with a locking protrusion 2111.

The catch body 31 has a catch recess 311 and a mounting opening 312. The catch recess 311 mates with the locking protrusion 2111, the mounting opening 312 is located below the catch recess 311, and the mounting opening 312 is configured to allow the locking protrusion 2111 to enter and exit the catch recess 311. In this way, the locking protrusion 2111 mates with the catch recess 311 to reliably lock the locking portion 211 and the catch body 31 together, thereby realizing the reliable fixing of the power supply module 2 to the lamp body 1, so that the structure is simple and practical, and the locking reliability is high.

Referring to FIG. 2, in an implementation, the locking portion 211 has a limiting slot 2112. The limiting slot 2112 mates with the catch body 31 to restrict a lateral movement of the catch body 31 relative to the power supply module 2, thereby restricting a lateral movement of the power supply module 2 relative to the lamp body 1, so that the power supply module 2 is more stably fixed to the lamp body 1, and the structural reliability is higher.

Referring to FIGS. 2-5, in an implementation, the lamp body 1 has an engagement slot 111 and a connection hole 112. The engagement slot 111 is spaced apart from the connection hole 112.

The elastic member 32 is provided with a first connecting arm 321. At least part of the first connecting arm 321 is inserted in the engagement slot 111 to restrict a movement of the first connecting arm 321 in a radial direction of the lamp body 1.

The catch 3 further includes:

a first fastener 33. A shank 331 of the first fastener 33 is threadedly connected to the connection hole 112, a head 332 of the first fastener 33 is located above the engagement slot 111, and the head 332 of the first fastener 33 abuts against the first connecting arm 321 to restrict the first connecting arm 321 in the engagement slot 111. In this way, it is possible to mate the at least part of the first connecting arm 321 with the engagement slot 111 to limit the movement of the first connecting arm 321, so as to restrict the movement of the elastic member 32 in the radial direction of the lamp body 1. Moreover, it is also possible to abut the head 332 of the first fastener 33 against the first connecting arm 321 to restrict the first connecting arm 321 in the engagement slot 111, so as to vertically limit the elastic member 32, so that the elastic member 32 is reliably fixed to the lamp body 1, and the mounting structure of the elastic member 32 is simple and practical, the connection reliability is high, and the mounting operation is convenient. The mounting efficiency of the power supply module 2 can be further improved.

In an implementation, that first fastener 33 may be a screw, or may be a bolt, a rivet, or another fastening structure.

In other implementations, the elastic member 32 may be fixed directly to the lamp body 1 via the first fastener 33.

Figure 6:
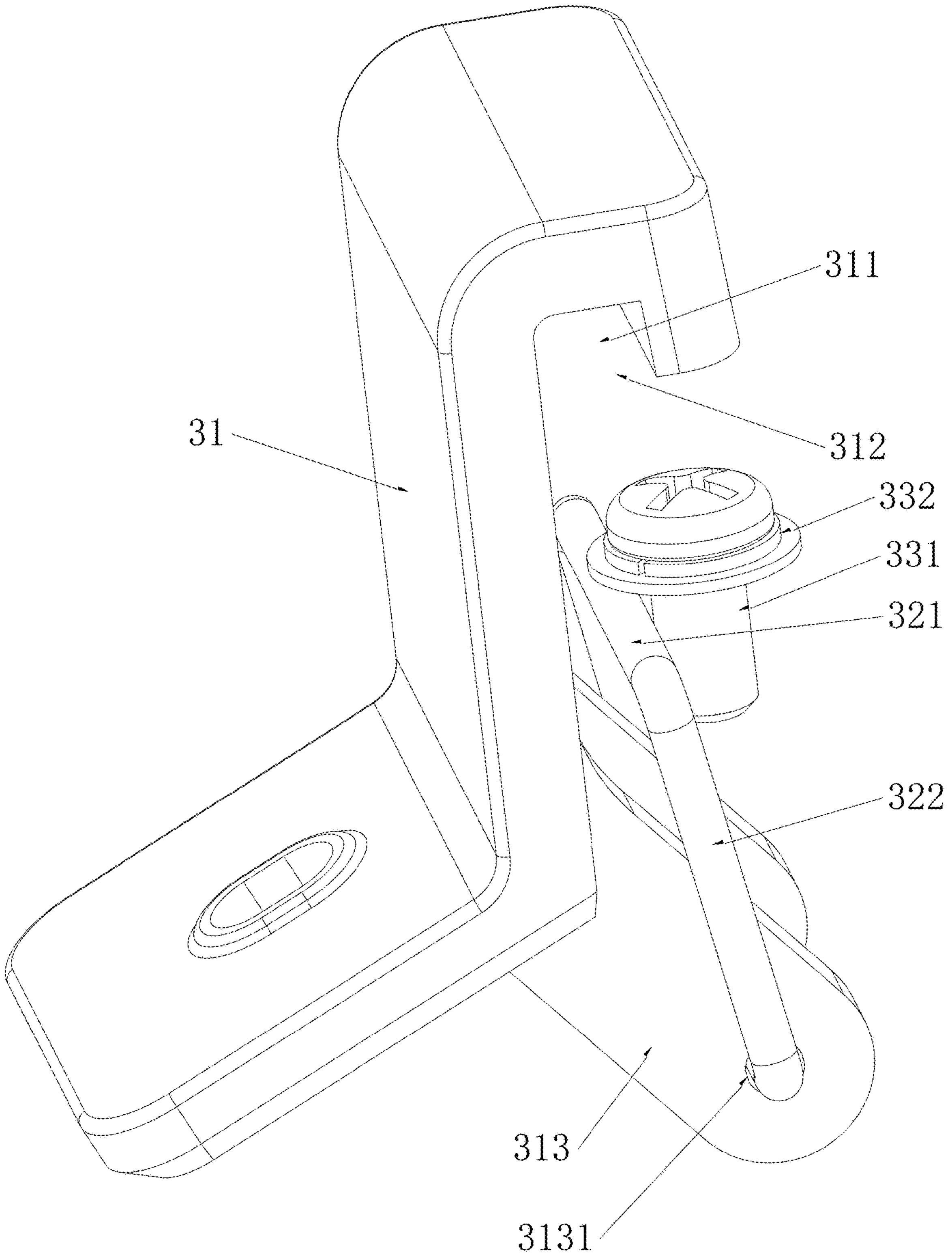
FIG. 6 is a schematic perspective view of the structure of the catch in Embodiment 1 of the present disclosure.

Referring to FIG. 6, in an implementation, the catch body 31 is provided with two second connecting arms 313. The two second connecting arms 313 are spaced apart from each other, the second connecting arms 313 each have a mounting hole 3131, and the mounting hole 3131 extends through the corresponding second connecting arm 313.

The elastic member 32 is further provided with two third connecting arms 322. The two third connecting arms 322 are arranged at two ends of the first connecting arm 321, respectively. Each of the third connecting arms 322 abuts against a side of a corresponding one of the second connecting arms 313 facing away from the other of the second connecting arms 313, and an end of the third connecting arm 322 away from the first connecting arm 321 is rotatably inserted in a corresponding one of the mounting holes 3131. Based on the fact that each of the third connecting arms 322 abuts against the side of the corresponding one of the second connecting arms 313 facing away from the other of the second connecting arms 313 so that the two second connecting arms 313 are sandwiched by the two third connecting arms 322 and the elastic member 32 thus applies the locking force on the catch body 31, and also based on the fact that the end of the third connecting arm 322 away from the first connecting arm 321 is rotatably inserted in the corresponding one of the mounting holes 3131 so that the catch body 31 and the elastic member 32 are rotatably connected together, the connecting structure consisting of the second connecting arms 313 and the third connecting arms 322 is simple and practical, the mounting operation is convenient, the mounting efficiency is high, and the cost is low, facilitating the reduction of the cost of the lamp.

Referring to FIG. 1, in an implementation, the catch body 31 is further provided with a fourth connecting arm 314. The fourth connecting arm 314 is disposed on the lamp body 1, and the fourth connecting arm 314 is fixed to the lamp body 1 via a second fastener 34, so that the catch body 31 reliably maintains the locking station, thereby making the power supply module 2 more stably and reliably fixed to the lamp body 1.

The second fastener 34 may be a screw or a bolt.

Referring to FIG. 1, in an implementation, the number of locking portions 211 and the number of catches 3 are both two. The two locking portions 211 are located on opposite sides of the power supply module 2, respectively, and the catch body 31 of each of the catches 3 is engaged with a corresponding one of the locking portions 211 to realize a reliable fixing of the power supply module 2 to the lamp body 1. Moreover, it is also possible to perform dismounting and mounting with both hands, making the replacement of the power supply more efficient.

In other implementations, the number of locking portions 211 and the number of catches 3 each may be three or more, which may be set according to actual requirements.

Figure 3:
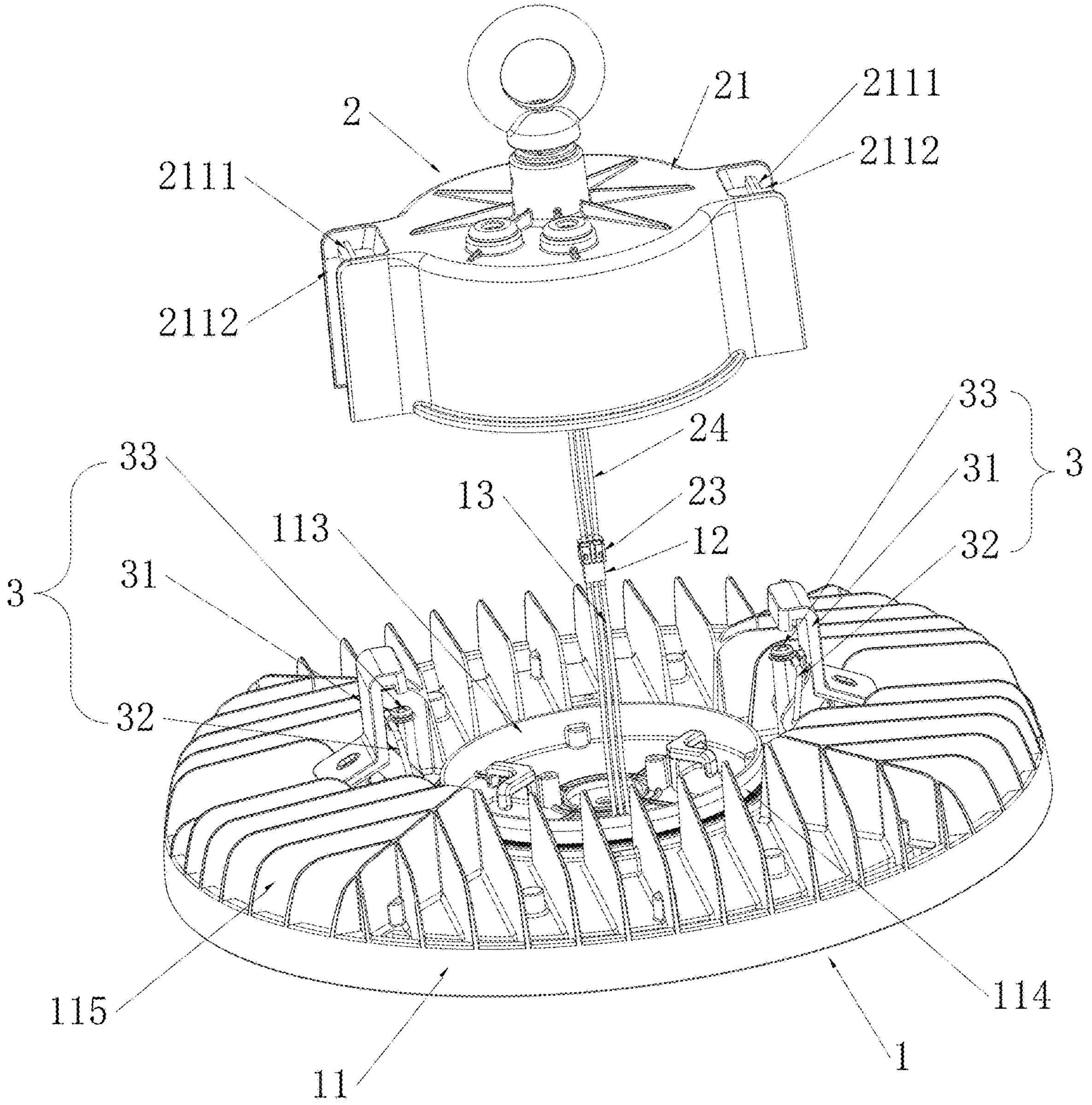
FIG. 3 is an exploded view of the lamp with a replaceable power supply module in Embodiment 1 of the present disclosure.

Referring to FIGS. 2 and 3, in an implementation, the lamp body 1 is provided with a first connection terminal 12. The first connection terminal 12 is electrically connected to a lamp board (not shown) in the lamp body 1.

The power supply module 2 includes:

- a power supply box 21, the power supply box 21 being disposed on the lamp body 1;
- a power supply (not shown) arranged in the power supply box 21; and
- a second connection terminal 23, the second connection terminal 23 being electrically connected to the power supply, and the second connection terminal 23 being inserted into and mating with the first connection terminal 12 to electrically connect the power supply and the lamp board together. In this way, the power supply and the lamp board can be electrically connected together by the second connection terminal 23 inserted into and mating with the first connection terminal 12, to realize a solderless electrical connection between the power supply module 2 and the lamp body 1. The electrical connection and disconnection operations are simpler and more convenient, the dismounting and mounting efficiency of the power supply module 2 can be further improved, and the replacement of the power supply module 2 is more convenient.

It can be understood that one of the first connection terminal 12 and the second connection terminal 23 is a male plug connector, and the other is a female plug connector.

In an implementation, the power supply box 21 and the lamp body 1 enclose a receiving cavity (not shown), and the first connection terminal 12 and the second connection terminal 23 are located in the receiving cavity.

The lamp with a replaceable power supply module further includes:

- a seal ring 22. The seal ring 22 is sandwiched between the power supply box 21 and the lamp body 1 by a locking force applied by the catch body 31 on the power supply module 2, and the seal ring 22 is arranged around the receiving cavity to seal a gap between the power supply box 21 and the lamp body 1. By receiving the first connection terminal 12 and the second connection terminal 23 in the receiving cavity, a concealed mounting of the first connection terminal 12 and the second connection terminal 23 can be realized, making the appearance of the lamp more concise. Moreover, the seal ring 22 may be used to seal the gap between the power supply box 21 and the lamp body 1 to seal the receiving cavity to provide a waterproof function. Furthermore, based on the fact that the first connection terminal 12 and the second connection terminal 23 are both located in the sealed receiving cavity, the first connection terminal 12 and the second connection terminal 23, which are not waterproof, can be used, so that the cost of the lamp can be further reduced.

Figure 4:
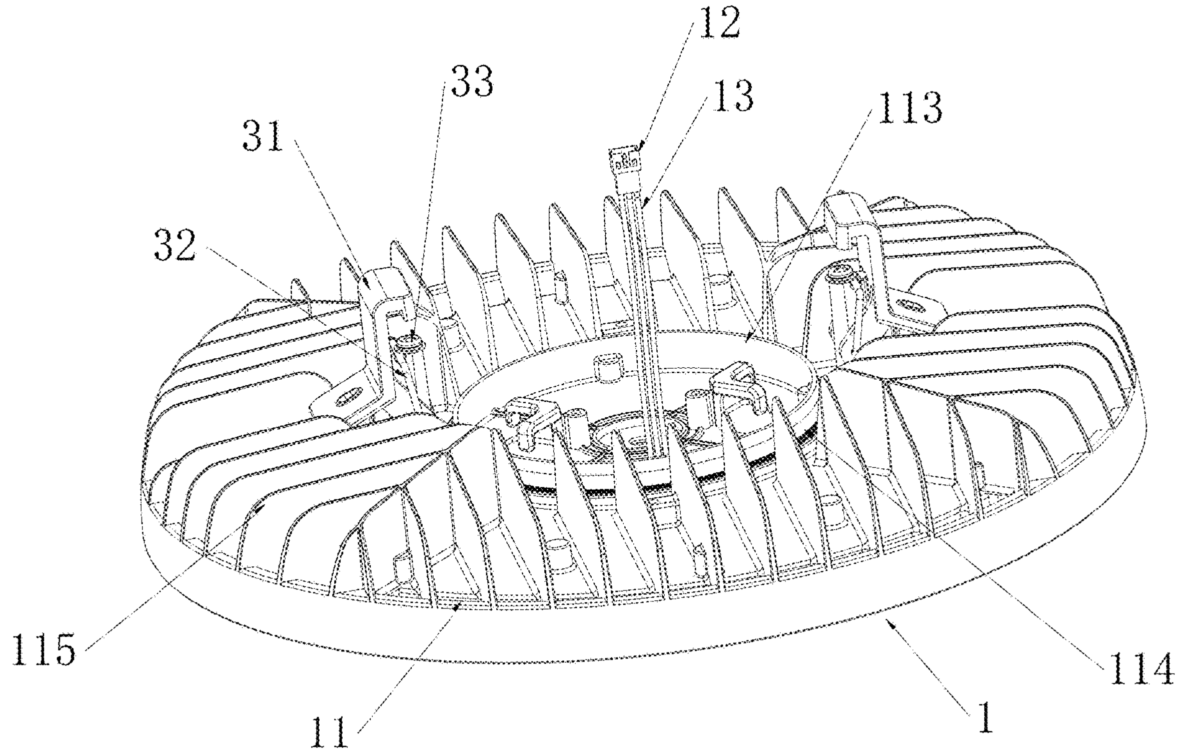
FIG. 4 is a view of a lamp body assembled with a catch in Embodiment 1 of the present disclosure.
Figure 5:
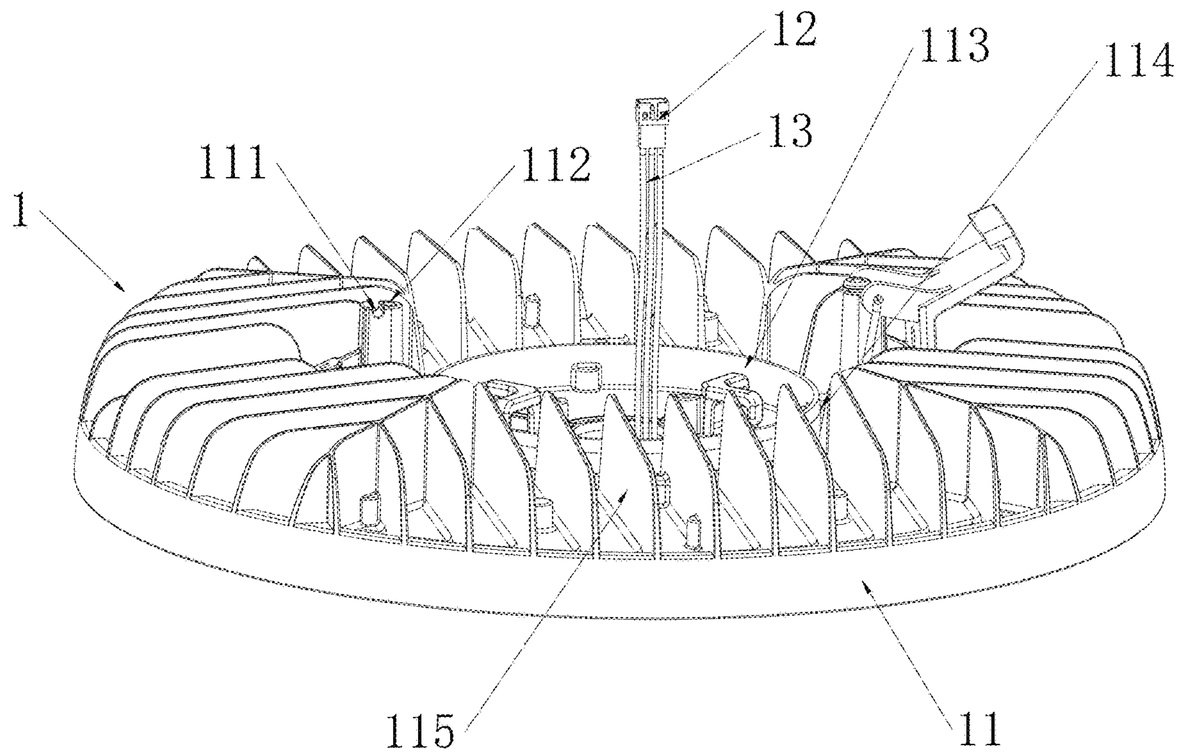
FIG. 5 is a schematic perspective view of the structure of the lamp body in Embodiment 1 of the present disclosure.

Referring to FIG. 4, in an implementation, the lamp body 1 is provided with a positioning protrusion 113. The positioning protrusion 113 mates with the power supply box 21 and encloses the receiving cavity with the power supply box 21. In this way, during mounting of the power supply module 2, the mounting and positioning of the power supply module 2 are realized by mating the positioning protrusion 113 with the power supply box 21, so that it is convenient to quickly dispose the power supply module 2 in a set position of the lamp body 1, making the mounting of the power supply module 2 more convenient.

Referring to FIG. 4, in an implementation, the lamp body 1 has a positioning groove 114. The positioning groove 114 is arranged around the receiving cavity, and the positioning groove 114 mates with the seal ring 22 to position the seal ring 22, thereby ensuring that the seal ring 22 is reliably fixed in the set position to improve the sealing reliability of the receiving cavity.

Referring to FIGS. 2-3, in an implementation, the lamp body 1 is further provided with a power supply input line 13. One end of the power supply input line 13 is electrically connected to the lamp board, and the other end of the power supply input line 13 is electrically connected to the first connection terminal 12.

The power supply module 2 further comprises a power supply output line 24. One end of the power supply output line 24 is electrically connected to the power supply, and the other end of the power supply output line 24 is electrically connected to the second connection terminal 23. The power supply input line 13 is arranged such that the first connection terminal 12 is spaced apart from the lamp body 1 by a distance, and the power supply output line 24 is arranged such that the second connection terminal 23 is spaced apart from the power supply box 21 by a distance. The coupling difficulty between the first connection terminal 12 spaced apart from the lamp body 1 and the second connection terminal 23 spaced apart from the power supply box 21 can be reduced, so that the second connection terminal 23 and the first connection terminal 12 can be quickly inserted into each other, the mounting of the power supply module 2 is more convenient and the mounting efficiency is higher.

Referring to FIG. 1, in an implementation, the lamp body 1 is provided with a heat dissipation base 11. The lamp board is located in the heat dissipation base 11, and the heat dissipation base 11 is provided with a plurality of heat dissipation fins 115. The plurality of heat dissipation fins 115 are located between the lamp board and the power supply module 2, the plurality of heat dissipation fins 115 are arranged at intervals around a vertical centerline of the lamp board, and the plurality of heat dissipation fins 115 are arranged around the power supply module 2. The heights of the heat dissipation fins 115 gradually decrease from the inside to the outside to realize rapid heat dissipation of the lamp board and the power supply module 2, so that the heat dissipation is more efficient.

Embodiment 2

Referring to FIGS. 7-12, a lamp with a replaceable power supply module 2 according to another preferred implementation of the present disclosure is shown. The lamp includes:

- a lamp body 1, the lamp body 1 being provided with a lamp housing 11, a lamp board 12 and a first connection terminal 13, the lamp board 12 being arranged in the lamp housing 11, the lamp board 12 being electrically connected to a lamp bead 121, the first connection terminal 13 being exposed to the lamp housing 11, and the first connection terminal 13 being electrically connected to the lamp board 12;
- a power supply module 2, the power supply module 2 being provided with a power supply box 21, a power supply 22, and a second connection terminal 23, the power supply box 21 being disposed on the lamp housing 11, the power supply box 21 being provided with a locking portion 211, the power supply 22 being arranged in the power supply box 21, the second connection terminal 23 being exposed to the power supply box 21, the second connection terminal 23 being electrically connected to the power supply 22, and the second connection terminal 23 being inserted into and mating with the first connection terminal 13 to electrically connect the power supply 22 and the lamp board 12 together; and a catch 4, the catch 4 being provided with a catch body 41 and an elastic member 42 connected to the lamp housing 11, the catch body 41 being rotatably connected to the elastic member 42, the catch body 41 having a locking station engaged with the locking portion 211, to removably connect the power supply box 21 and the lamp housing 11 together, the catch body 41 further having an unlocking station disengaged from the locking portion 211 to enable the power supply box 21 to be separated from the lamp housing 11, the catch body 41 rotating to switch between the locking station and the unlocking station, and the elastic member 42 being configured to provide a locking force to the catch body 41 to restrict the catch body 41 to the locking station.

For the lamp of the present disclosure, since the mechanical connection structure of the power supply box 21 and the lamp housing 11 is composed of the locking portion 211 and the catch 4, and is a screw-free connection structure, toolless mechanical dismounting and mounting of the power supply module 2 can be realized. Moreover, since the first connection terminal 13 is electrically connected to the lamp board 12, the second connection terminal 23 is electrically connected to the power supply 22, and the second connection terminal 23 is inserted into and mates with the first connection terminal 13 so that the power supply 22 and the lamp board 12 are electrically connected together, the solderless electrical connection between the power supply module 2 and the lamp body 1 is realized, and the electrical connection operation is simpler and more convenient. During dismounting, it is only necessary to pull the second connection terminal 23 out of the first connection terminal 13, so that the dismounting operation is simple and convenient. The electrical dismounting and mounting of the power supply module 2 can be realized, and the dismounting and mounting of the power supply module 2 can thus be realized, facilitating the replacement of the power supply module 2. Therefore, in the event of damage to the power supply module 2, it is possible to replace only the power supply module 2 without replacing the entire lamp, reducing unnecessary waste and greatly reducing the cost of use. In addition, since the lamp body 1 and the power supply module 2 are separate removable modules, one lamp body 1 can be adapted to a variety of different power supply modules 2, making the use more flexible and convenient.

It can be understood that, during mounting, it is possible to first cause the first connection terminal 13 to be inserted into and mate with the second connection terminal 23, then dispose the power supply module 2 on the lamp body 1, and then engage the catch body 41 with the locking portion 211 to enable the power supply module 2 to be fixed to the lamp body 1 by the locking force provided by the elastic member 42 to the catch body 41, so that a screw-free fixing and mounting of the power supply module 2 is realized. The fixing and mounting process is carried out without the use of tools. The power supply module 2 can be mounted by hand, the mounting operation is simpler and more convenient, and the mounting efficiency is high. During dismounting, a rotation force applied on the catch body 41 against the locking force can cause the catch body 41 to be disengaged from the locking portion 211, to unlock the power supply module 2, and the second connection terminal 23 is pulled out of the first connection terminal 13, so that tool-less unlocking of the power supply module 2 is realized, and the power supply module 2 can be dismounted by hand. The dismounting operation is simpler and more convenient, and the dismounting efficiency is high, greatly improving the replacement efficiency of the power supply 22. The power supply box 21 is removably arranged on the lamp housing 11.

It can be understood that one of the first connection terminal 13 and the second connection terminal 23 is a male plug connector, and the other is a female plug connector. The male plug connector and the female plug connector are coupled to each other via copper pins to conduct current.

Figure 10:
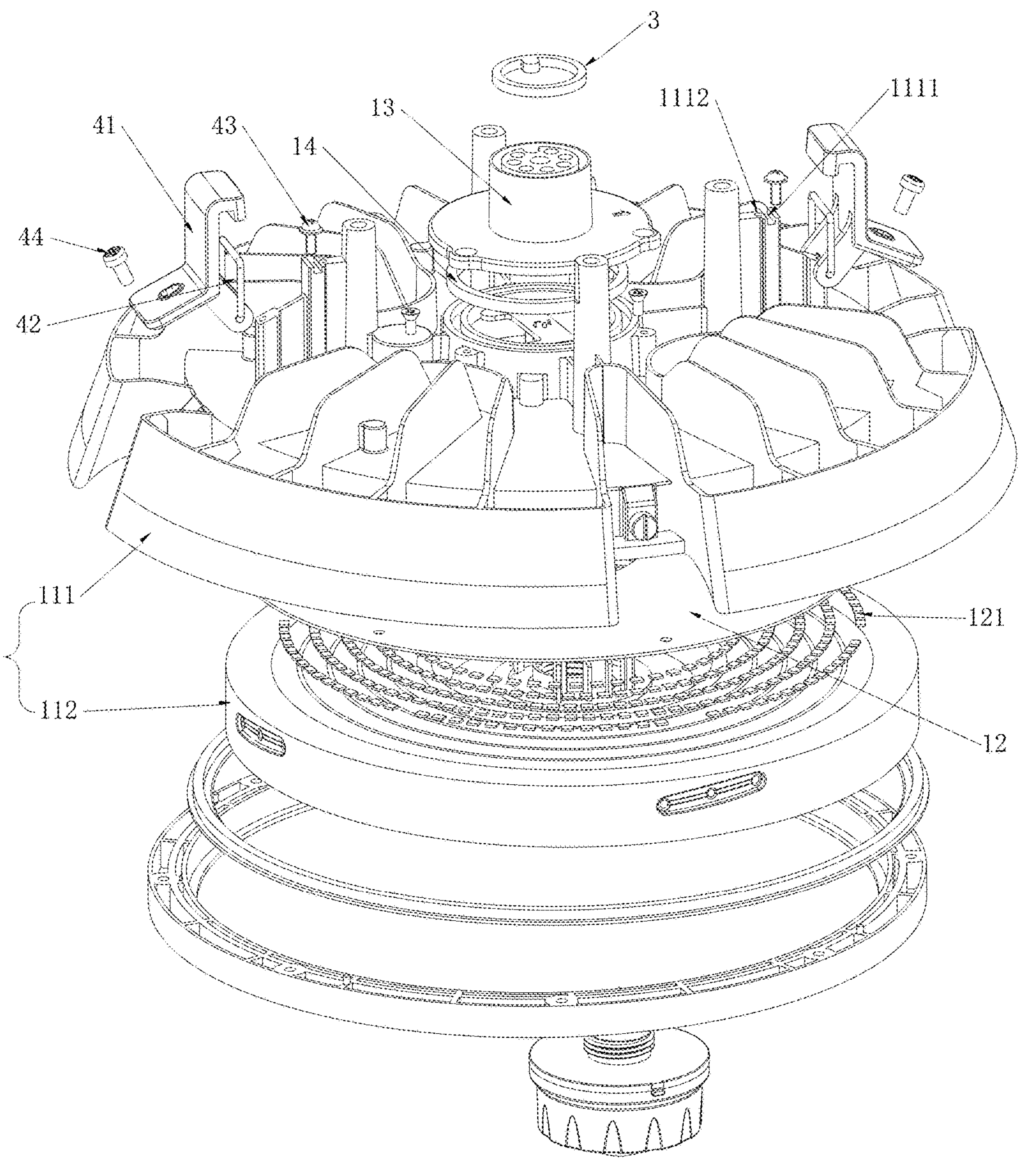
FIG. 10 is an exploded view of a lamp body in Embodiment 2 of the present disclosure.
Figure 11:
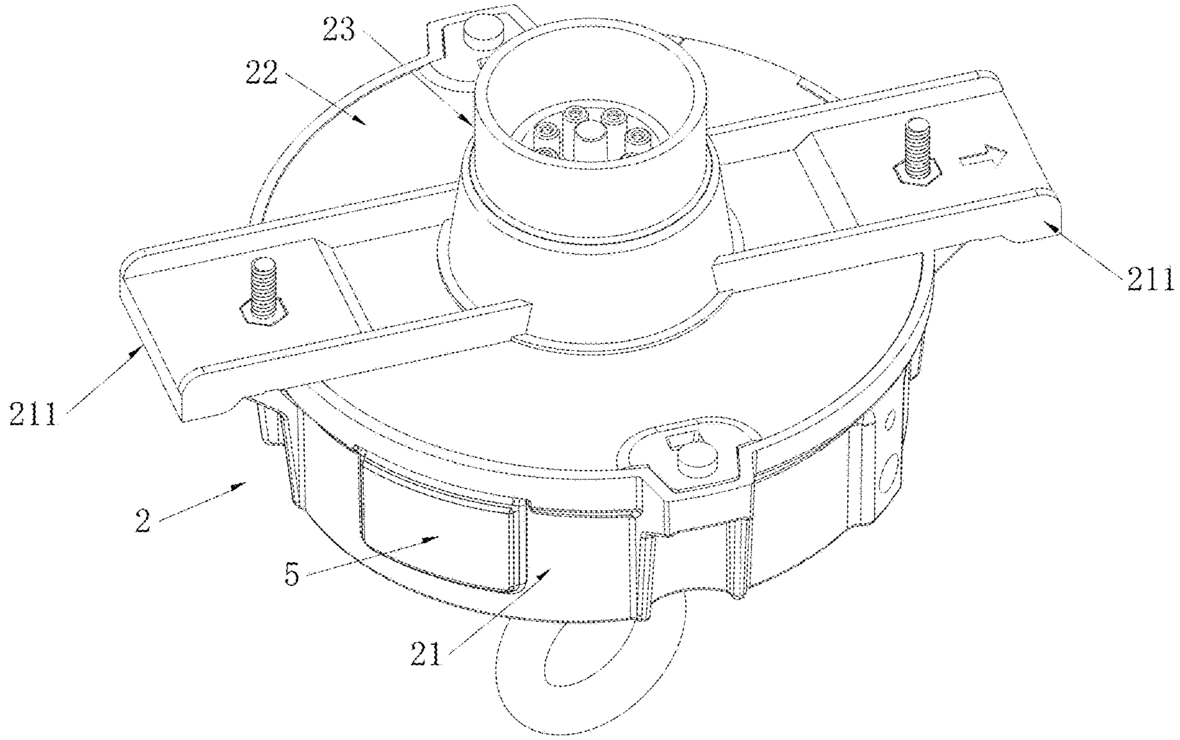
FIG. 11 is a schematic perspective view of the structure of a power supply module in Embodiment 2 of the present disclosure.

Referring to FIG. 10, in an implementation, the lamp with a replaceable power supply module 2 further includes:

a first seal ring 3. The first seal ring 3 is sandwiched between the first connection terminal 13 and the second connection terminal 23, and the first seal ring 3 is arranged around a vertical centerline of the first connection terminal 13 to seal a gap between the first connection terminal 13 and the second connection terminal 23 to provide a waterproof function, preventing leakage of external water and liquid from the gap between the first connection terminal 13 and the second connection terminal 23 to the inside of the first connection terminal 13 and of the second connection terminal 23, so that the lamp can be adapted to indoor, outdoor and other places.

Referring to FIG. 10, in an implementation, the lamp body 1 is further provided with a second seal ring 14. The second seal ring 14 is sandwiched between the lamp housing 11 and the first connection terminal 13, and the second seal ring 14 is arranged around the vertical centerline of the first connection terminal 13 to seal a gap between the lamp housing 11 and the first connection terminal 13 to provide a waterproof function, preventing leakage of external water and liquid from the gap between the lamp housing 11 and the first connection terminal 13 to the inside of the first connection terminal 13 or the inside of the lamp housing 11, so that the lamp can be adapted to indoor, outdoor and other places.

Figure 8:
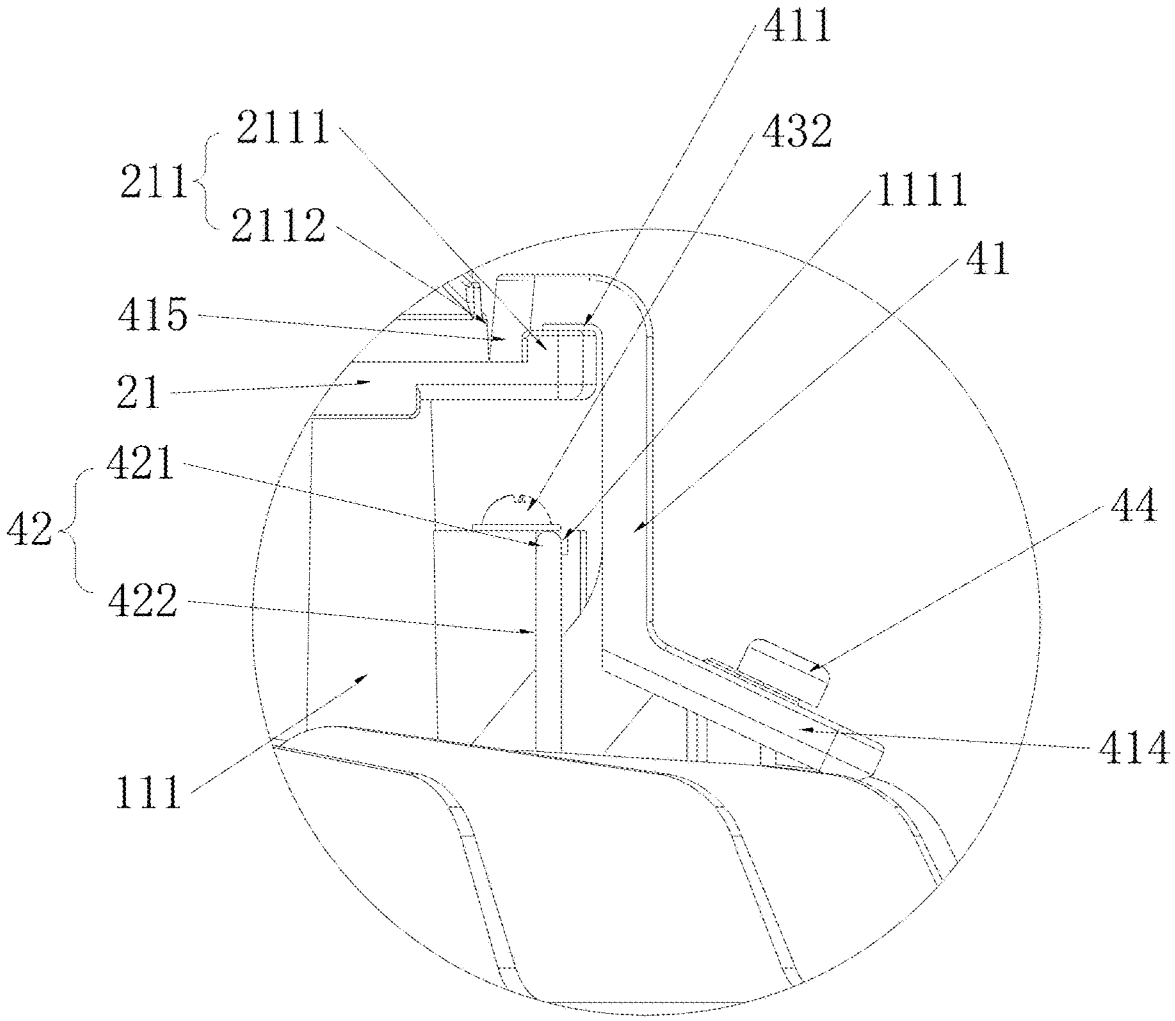
FIG. 8 is a partial enlarged view of part A in FIG. 7.
Figure 9:
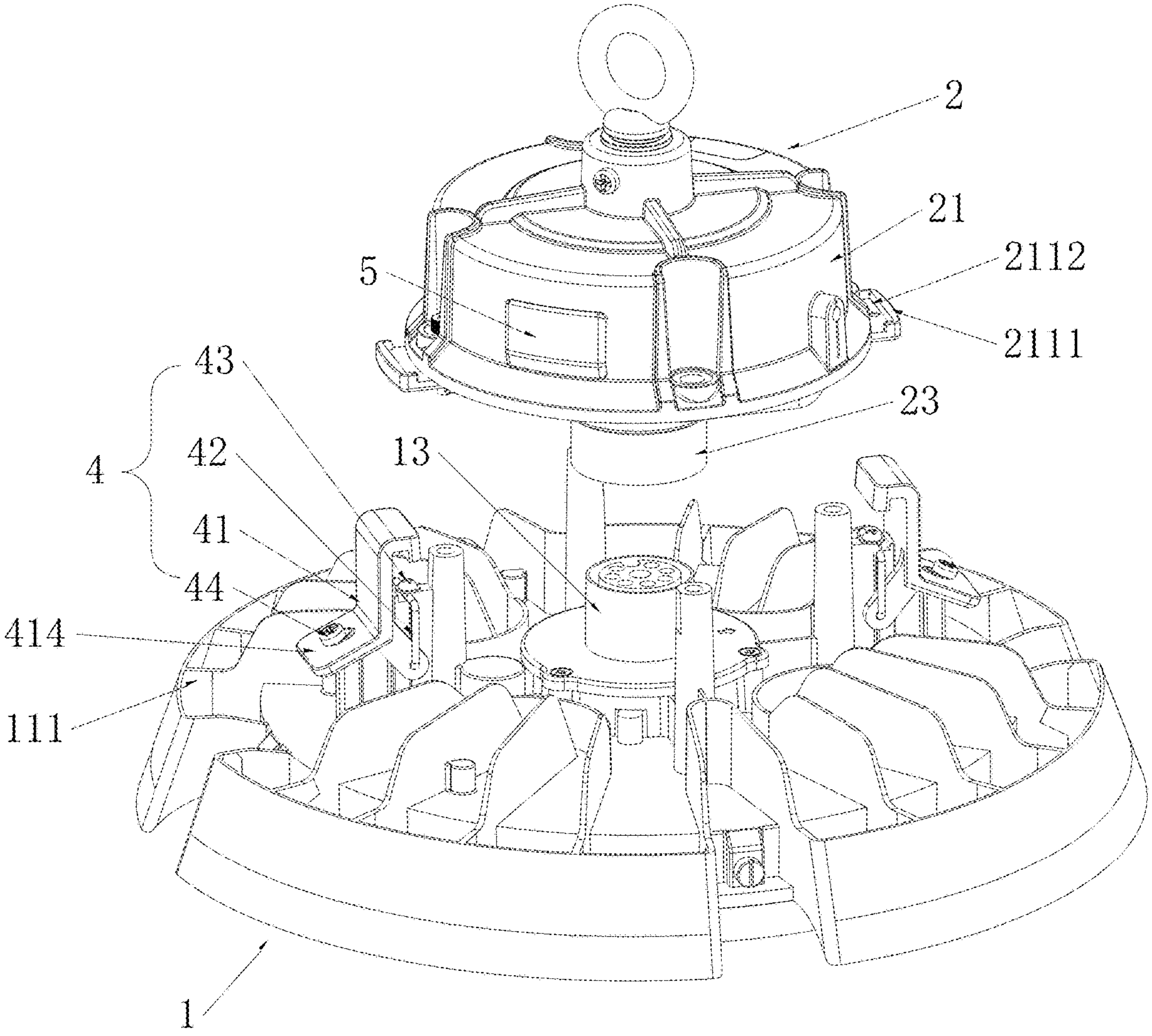
FIG. 9 is an exploded view of the lamp with a replaceable power supply module in Embodiment 2 of the present disclosure.
Figure 12:
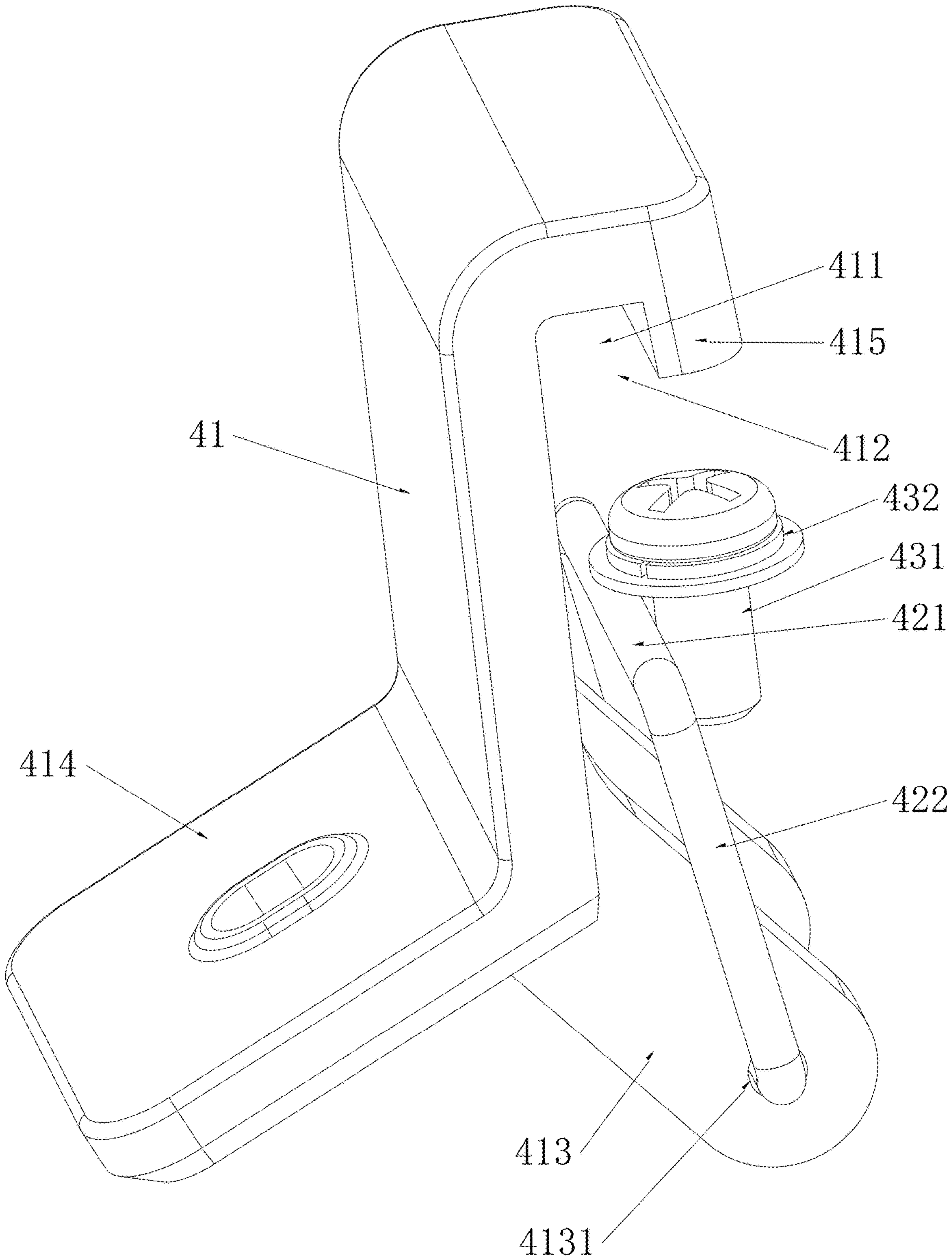
FIG. 12 is a schematic perspective view of the structure of a catch in Embodiment 2 of the present disclosure.

Referring to FIGS. 8-9 and 12, in an implementation, the locking portion 211 is provided with a locking protrusion 2111.

The catch body 41 has a catch recess 411 and a mounting opening 412. The catch recess 411 mates with the locking protrusion 2111, the mounting opening 412 is located below the catch recess 411, and the mounting opening 412 is configured to allow the locking protrusion 2111 to enter and exit the catch recess 411. In this way, the locking protrusion 2111 mates with the catch recess 411 to reliably lock the locking portion 211 and the catch body 41 together, thereby realizing the reliable fixing of the power supply module 2 to the lamp body 1, so that the structure is simple and practical, and the locking reliability is high.

Referring to FIGS. 8 and 12, in an implementation, the locking portion 211 has a limiting slot 2112.

The catch body 41 is provided with a limiting protrusion 415. The limiting protrusion 415 mates with the limiting slot 2112 to restrict a lateral movement of the power supply box 21 relative to the lamp body 1, thereby limiting a lateral movement of the power supply module 2 relative to the lamp body 1, so that the power supply module 2 is more stably fixed to the lamp body 1, and the structural reliability is higher.

Referring to FIGS. 8 and 10, in an implementation, the lamp housing 11 has an engagement slot 1111 and a connection hole 1112. The engagement slot 1111 is spaced apart from the connection hole 1112.

The elastic member 42 is provided with a first connecting arm 421. At least part of the first connecting arm 421 is disposed in the engagement slot 1111 to restrict a movement of the first connecting arm 421 in a radial direction of the lamp body 1.

The catch 4 further includes:

a first fastener 43. A shank 431 of the first fastener 43 is threadedly connected to the connection hole 1112, a head 432 of the first fastener 43 is located above the engagement slot 1111, and the head 432 of the first fastener 43 abuts against the first connecting arm 421 to restrict the first connecting arm 421 in the engagement slot 1111. In this way, it is possible to mate the at least part of the first connecting arm 421 with the engagement slot 1111 to limit the movement of the first connecting arm 421, so as to restrict the movement of the elastic member 42 in the radial direction of the lamp body 1. Moreover, it is also possible to abut the head 432 of the first fastener 43 against the first connecting arm 421 to restrict the first connecting arm 421 in the engagement slot 1111, so as to vertically limit the elastic member 42, so that the elastic member 42 is reliably fixed to the lamp body 1, and the mounting structure of the elastic member 42 is simple and practical, the connection reliability is high, and the mounting operation is convenient. The mounting efficiency of the power supply module 2 can be further improved.

Referring to FIGS. 8 and 12, in an implementation, the catch body 41 is provided with two second connecting arms 413. The two second connecting arms 413 are spaced apart from each other, the second connecting arms 413 each have a mounting hole 4131, and the mounting hole 4131 extends through the corresponding second connecting arm 413.

The elastic member 42 is further provided with two third connecting arms 422. The two third connecting arms 422 are arranged at two ends of the first connecting arm 421, respectively. Each of the third connecting arms 422 abuts against a side of a corresponding one of the second connecting arms 413 facing away from the other of the second connecting arms 413, and an end of the third connecting arm 422 away from the first connecting arm 421 is rotatably inserted in a corresponding one of the mounting holes 4131. Based on the fact that each of the third connecting arms 422 abuts against the side of the corresponding one of the second connecting arms 413 facing away from the other of the second connecting arms 413 so that the two second connecting arms 413 are sandwiched by the two third connecting arms 422 and the elastic member 42 thus applies the locking force on the catch body 41, and also based on the fact that the end of the third connecting arm 422 away from the first connecting arm 421 is rotatably inserted in the corresponding one of the mounting holes 4131 so that the catch body 41 and the elastic member 42 are rotatably connected together, the connecting structure consisting of the second connecting arms 413 and the third connecting arms 422 is simple and practical, the mounting operation is convenient, the mounting efficiency is high, and the cost is low, facilitating the reduction of the cost of the lamp.

Referring to FIG. 9, in an implementation, the catch body 41 is further provided with a fourth connecting arm 414. The fourth connecting arm 414 is disposed on the lamp housing 11, and the fourth connecting arm 414 is removably fixed to the lamp housing 11 via a second fastener 44, so that the catch body 41 reliably maintains the locking station, thereby making the power supply module 2 more stably and reliably fixed to the lamp body 1.

The second fastener 44 may be a screw or a bolt.

Figure 7:
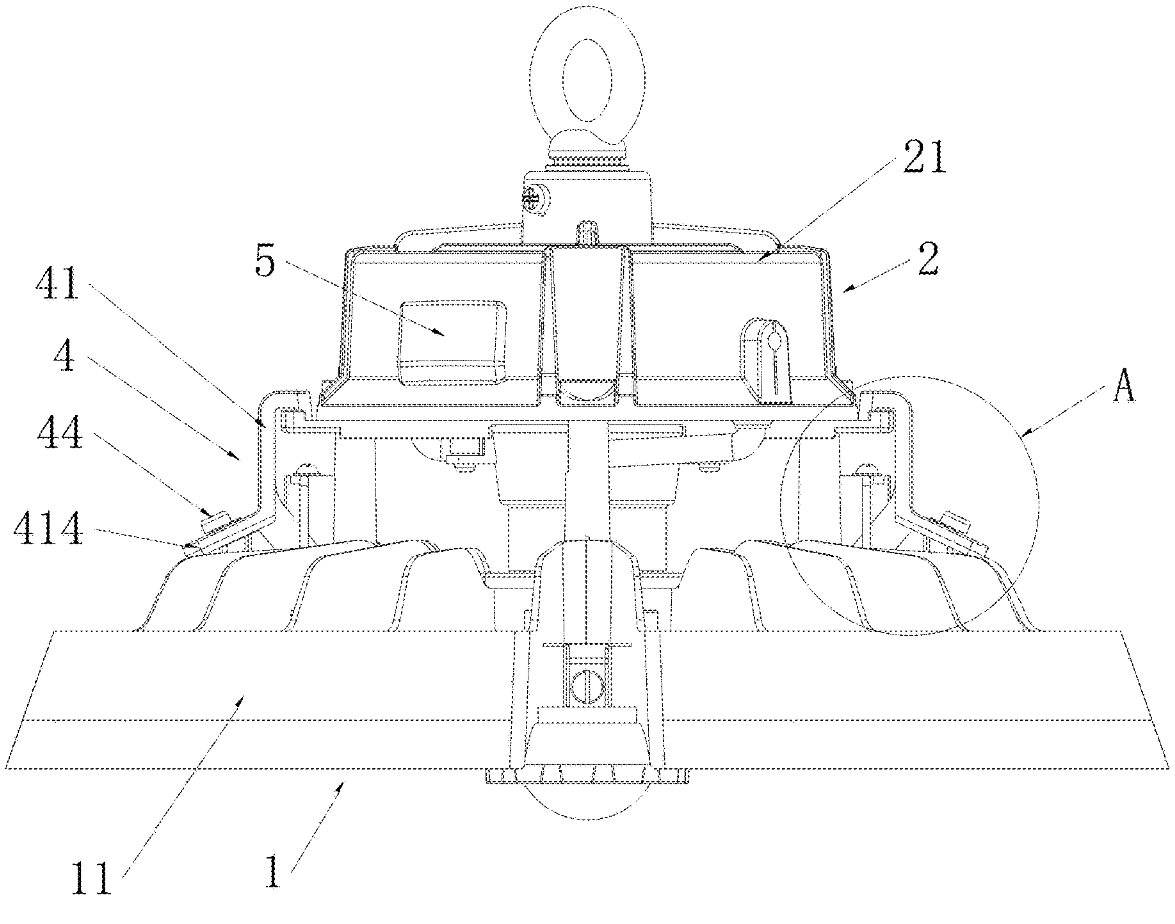
FIG. 7 is a schematic perspective view of the structure of a lamp with a replaceable power supply module in Embodiment 2 of the present disclosure.

Referring to FIG. 7, in an implementation, the number of locking portions 211 and the number of catches 4 are both two. The two locking portions 211 are located on opposite sides of the power supply box 21, respectively, and the catch body 41 of each of the catches 4 is engaged with a corresponding one of the locking portions 211 to realize a reliable fixing of the power supply module 2 to the lamp body 1. Moreover, it is also possible to perform dismounting and mounting with both hands, making the replacement of the power supply 22 more efficient.

In other implementations, the number of locking portions 211 and the number of catches 4 each may be three or more, which may be set according to actual requirements.

Referring to FIG. 7, in an implementation, the power supply module 2 further includes:

a DIP switch 5. The DIP switch 5 is arranged on the power supply box 21, the DIP switch 5 is electrically connected to the power supply 22, and the DIP switch 5 is configured to adjust an input voltage and/or to adjust brightness and/or to adjust color temperature and/or to adjust power, so that the input voltage can be adjusted by operating the DIP switch 5. The input voltage is 120-277 V, 120-247 V, or 277-480 V, so that the lamp can be adapted to different application scenarios. In addition, it is possible to adjust the brightness and the color temperature of the lamp bead 121 on the lamp board 12 by operating the DIP switch 5, and it is also possible to adjust the power by operating the DIP switch 5, making the functions of the lamp more diversified, so that the lamp can meet different usage requirements and be more flexible and convenient.

Referring to FIGS. 7, 9 and 10, the lamp housing 11 includes a heat dissipation base 111 and a lens 112. The heat dissipation base 111 has an accommodating cavity, the lamp board 12 is arranged in the accommodating cavity, the lens 112 is arranged at the bottom of the heat dissipation base 111, the lens 112 covers a bottom opening of the accommodating cavity, and the lens 112 is arranged opposite to the lamp bead 121 on the lamp board 12, so that light emitted by the lamp bead 121 when working can be transmitted to the outside through the lens 112, and the power supply module 2 is arranged on the top of the heat dissipation base 111. In this way, the heat dissipation base 111 can be used to quickly dissipate heat from the lamp board 12 and the power supply module 2, making heat dissipation more efficient.

In the description of this specification, descriptions with reference to the terms such as “an embodiment”, “some embodiments”, “example”, “specific example”, or “some examples” mean that specific features, structures, materials, or characteristics described with reference to the embodiment or example are included in at least one embodiment or example of the present disclosure. Moreover, the specific features, structures, materials or characteristics described can be combined in any one or more embodiments or examples in any suitable manner. In addition, without any contradiction, those skilled in the art may incorporate and combine different embodiments or examples and features of the different embodiments or examples described in this specification.

In addition, the terms “first” and “second” are merely used for the purpose of illustration, and cannot be construed as indicating or implying relative importance or implicitly indicating the number of technical features indicated. Thus, the features defined with “first” and “second” may explicitly or implicitly include at least one of the features. In the description of the present disclosure, the meaning of "a plurality of" is two or more, unless explicitly and specifically defined otherwise.

The above descriptions are merely specific implementations of the present disclosure, but are not intended to limit the scope of protection of the present disclosure. Any variation or replacement readily figured out by those skilled in the art within the technical scope disclosed in the present disclosure shall fall within the scope of protection of the present disclosure. Therefore, the scope of protection of the present disclosure shall be subject to the scope of protection of the claims.

The invention claimed is:

1. A lamp with a replaceable power supply module, the lamp comprising:

a lamp body;

a power supply module disposed on the lamp body, the power supply module being provided with a locking portion; and a catch, the catch being provided with a catch body and an elastic member connected to the lamp body, the catch body being rotatably connected to the elastic member, the catch body having a locking station engaged with the locking portion, to connect the power supply module and the lamp body together, the catch body further having an unlocking station disengaged from the locking portion to enable the power supply module to be separated from the lamp body, the catch body rotating to switch between the locking station and the unlocking station, and the elastic member being configured to provide a locking force to the catch body to restrict the catch body to the locking station, wherein the locking portion is provided with a locking protrusion; and the catch body has a catch recess and a mounting opening, the catch recess mating with the locking protrusion, and the mounting opening being located below the catch recess and configured to allow the locking protrusion to enter and exit the catch recess.

2. The lamp with a replaceable power supply module according to claim 1, wherein the locking portion has a limiting slot, the limiting slot mating with the catch body to restrict a lateral movement of the catch body relative to the power supply module.

3. The lamp with a replaceable power supply module according to claim 1, wherein the lamp body has an engagement slot and a connection hole, the engagement slot being spaced apart from the connection hole;

the elastic member is provided with a first connecting arm, at least part of the first connecting arm being inserted in the engagement slot to restrict a movement of the first connecting arm in a radial direction of the lamp body; and the catch further comprises:

a first fastener, a shank of the first fastener being threadedly connected to the connection hole, a head of the first fastener being located above the engagement slot, and the head of the first fastener abutting against the first connecting arm to restrict the first connecting arm in the engagement slot.

4. The lamp with a replaceable power supply module according to claim 3, wherein the catch body is provided with two second connecting arms spaced apart from each other, the second connecting arms each having a mounting hole extending therethrough; and the elastic member is further provided with two third connecting arms arranged at two ends of the first connecting arm, respectively, each of the third connecting arms abutting against a side of a corresponding one of the second connecting arms facing away from the other of the second connecting arms, and an end of the third connecting arm away from the first connecting arm is rotatably inserted in a corresponding one of the mounting holes.

5. The lamp with a replaceable power supply module according to claim 4, wherein the catch body is further provided with a fourth connecting arm disposed on the lamp body, the fourth connecting arm being removably fixed to the lamp body via a second fastener.

6. The lamp with a replaceable power supply module according to claim 1, wherein the number of locking portions and the number of catches are both two, the two locking portions are located on opposite sides of the power supply module, respectively, and the catch body of each of the catches is engaged with a corresponding one of the locking portions.

7. The lamp with a replaceable power supply module according to claim 1, wherein the lamp body is provided with a first connection terminal electrically connected to a lamp board in the lamp body; and the power supply module comprises:

a power supply box disposed on the lamp body;

a power supply arranged in the power supply box; and a second connection terminal electrically connected to the power supply, the second connection terminal being inserted into and mating with the first connection terminal to electrically connect the power supply and the lamp board together.

8. The lamp with a replaceable power supply module according to claim 7, wherein the power supply box and the lamp body enclose a receiving cavity, and the first connection terminal and the second connection terminal are located in the receiving cavity; and the lamp with a replaceable power supply module further comprises:

a seal ring sandwiched between the power supply box and the lamp body by a locking force applied by the catch body on the power supply module, the seal ring being arranged around the receiving cavity to seal a gap between the power supply box and the lamp body.

9. The lamp with a replaceable power supply module according to claim 8, wherein the lamp body is provided with a positioning protrusion, the positioning protrusion mating with the power supply box and enclosing the receiving cavity with the power supply box.

10. The lamp with a replaceable power supply module according to claim 8, wherein the lamp body has a positioning groove, the positioning groove being arranged around the receiving cavity and mating with the seal ring.

11. The lamp with a replaceable power supply module according to claim 8, wherein the power supply module further comprises:

a DIP switch arranged on the power supply box, the DIP switch being electrically connected to the power supply and configured to adjust an input voltage and/or to adjust brightness and/or to adjust color temperature and/or to adjust power.

12. The lamp with a replaceable power supply module according to claim 7, wherein the lamp body is further provided with a power supply input line, one end of the power supply input line being electrically connected to the lamp board, and the other end of the power supply input line being electrically connected to the first connection terminal; and the power supply module further comprises a power supply output line, one end of the power supply output line being electrically connected to the power supply, and the other end of the power supply output line being electrically connected to the second connection terminal.

* * * * *